United States Patent
Omura et al.

(10) Patent No.: US 12,525,832 B2
(45) Date of Patent: Jan. 13, 2026

(54) ROTOR FOR ELECTRIC MOTOR AND METHOD FOR MANUFACTURING THE SAME

(71) Applicant: TOYOTA JIDOSHA KABUSHIKI KAISHA, Toyota (JP)

(72) Inventors: Kento Omura, Nagakute (JP); Shunsuke Kawasaki, Toyota (JP); Kenta Chimata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 190 days.

(21) Appl. No.: 18/490,431

(22) Filed: Oct. 19, 2023

(65) Prior Publication Data
US 2024/0154475 A1  May 9, 2024

(30) Foreign Application Priority Data
Nov. 4, 2022  (JP) .................. 2022-177102

(51) Int. Cl.
*H02K 1/2706* (2022.01)
*H02K 15/03* (2006.01)

(52) U.S. Cl.
CPC .......... *H02K 1/2706* (2013.01); *H02K 15/03* (2013.01); *H02K 2201/06* (2013.01)

(58) Field of Classification Search
CPC ... H02K 1/2706; H02K 15/03; H02K 2201/06
See application file for complete search history.

(56) References Cited

U.S. PATENT DOCUMENTS

| | | | |
|---|---|---|---|
| 2015/0380997 A1* | 12/2015 | Song | H02K 1/2773 29/598 |
| 2020/0153294 A1* | 5/2020 | Aono | H02K 1/27 |
| 2022/0021288 A1* | 1/2022 | Zhang | H02K 1/276 |

FOREIGN PATENT DOCUMENTS

| | | |
|---|---|---|
| JP | S56-129172 U | 10/1981 |
| JP | 11-299187 A | 10/1999 |
| JP | 2001-359266 A | 12/2001 |
| JP | 2012-080718 A | 4/2012 |
| JP | 2014-236592 A | 12/2014 |
| JP | 2019-115205 A | 7/2019 |
| JP | 2021-145511 A | 9/2021 |

* cited by examiner

*Primary Examiner* — Sean Gugger
(74) *Attorney, Agent, or Firm* — Sughrue Mion, PLLC

(57) ABSTRACT

A rotor for an electric motor may include a shaft extending along a rotation axis of the electric motor and a rotor core comprising a plurality of core blocks fixed to the shaft and arranged along the rotation axis. The plurality of core blocks may include a first core block and a second core block that are oriented differently from each other in a circumferential direction about the rotation axis. Each of the plurality of core blocks may include an outer surface extending along the circumferential direction, a center hole through which the shaft passes, and an outer groove defined in the outer surface. An inner surface of the center hole may be in continuous contact in the circumferential direction with an outer surface of the shaft over an entire circumference thereof.

13 Claims, 16 Drawing Sheets

ROTOR FOR ELECTRIC MOTOR AND METHOD FOR MANUFACTURING THE SAME

REFERENCE TO RELATED APPLICATIONS

This application claims priority from Japanese Patent Application No. 2022-177102 filed on Nov. 4, 2022. The entire contents of the priority application are incorporated herein by reference.

BACKGROUND ART

The present disclosure relates to a rotor of an electric motor and a method for manufacturing the same.

Japanese Patent Application Publication No. 2014-236592 describes a rotor for an electric motor. This rotor includes a shaft extending along a rotation axis of the electric motor and a rotor core fixed to the shaft. The rotor core includes a plurality of core blocks arranged along the rotation axis. The plurality of core blocks is arranged with predetermined angle differences such that they are oriented differently from each other in a circumferential direction. Such a structure of the rotor core is referred to as a skew (in particular, step skew).

DESCRIPTION

In a rotor core, a plurality of core plates is stacked along a shaft. In order to provide a skew in the rotor core, orientation needs to be changed for each core plate or every other core plates in the circumferential direction when a plurality of core plates is to be stacked. With regard to this point, a conventional rotor has a plurality of key grooves defined in its shaft, and a key disposed on each core plate is selectively engaged with one of the key grooves. In this way, a plurality of core blocks (i.e., a step skew) oriented differently from one another in the circumferential direction is disposed in the rotor core.

With the above configuration, the keys of the rotor core come into tight contact with the key grooves in the shaft. Thus, the inner surface of the rotor core may unevenly deform along the circumferential direction. Such uneven deformation may cause unnecessary vibration when an electric motor rotates. The present disclosure provides a technique that solves or mitigates such a problem.

The technique disclosed herein is embodied as a rotor for an electric motor. The rotor may comprise: a shaft extending along a rotation axis of the electric motor; and a rotor core comprising a plurality of core blocks fixed to the shaft and arranged along the rotation axis. The plurality of core blocks may include a first core block and a second core block that are oriented differently from each other in a circumferential direction about the rotation axis. Each of the plurality of core blocks may comprise an outer surface extending along the circumferential direction, a center hole through which the shaft passes, and an outer groove defined in the outer surface. An inner surface of the center hole may be in continuous contact in the circumferential direction with an outer surface of the shaft over an entire circumference thereof.

With the above configuration, the outer groove is defined in each of the plurality of core blocks. Since the outer groove is defined in the outer surface of each core block, it is possible to engage a guide member to the outer groove from outside regardless of the presence of the other core block(s). Consequently, the core blocks can be arranged in predetermined orientations with respect to the shaft without forming an uneven shape such as a key or a key groove on the outer surface of the shaft or the inner surfaces of the core blocks. This enables designing the cross-sectional shape of the inner surface of the center hole and the outer surface of the shaft such that the inner surface of the center hole is in continuous contact in the circumferential direction with the outer surface of the shaft over the entire circumference thereof. The inner surface of the rotor core does not unevenly deform along the circumferential direction, and unnecessary vibration and noise upon rotation of the electric motor can be suppressed.

DETAILED DESCRIPTION

Figure 1:
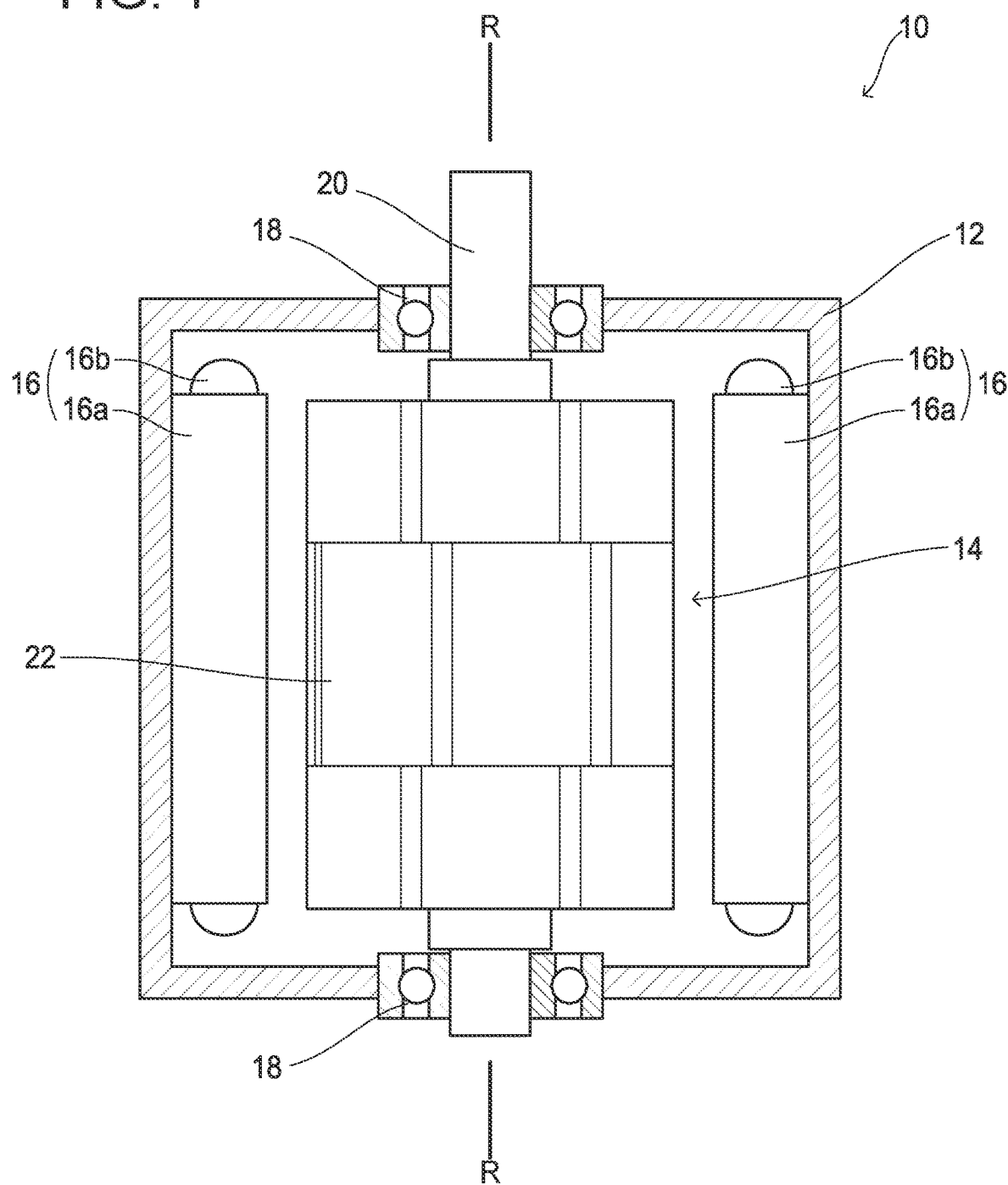
FIG. 1 schematically shows a motor 10 of an embodiment.
Figure 2:
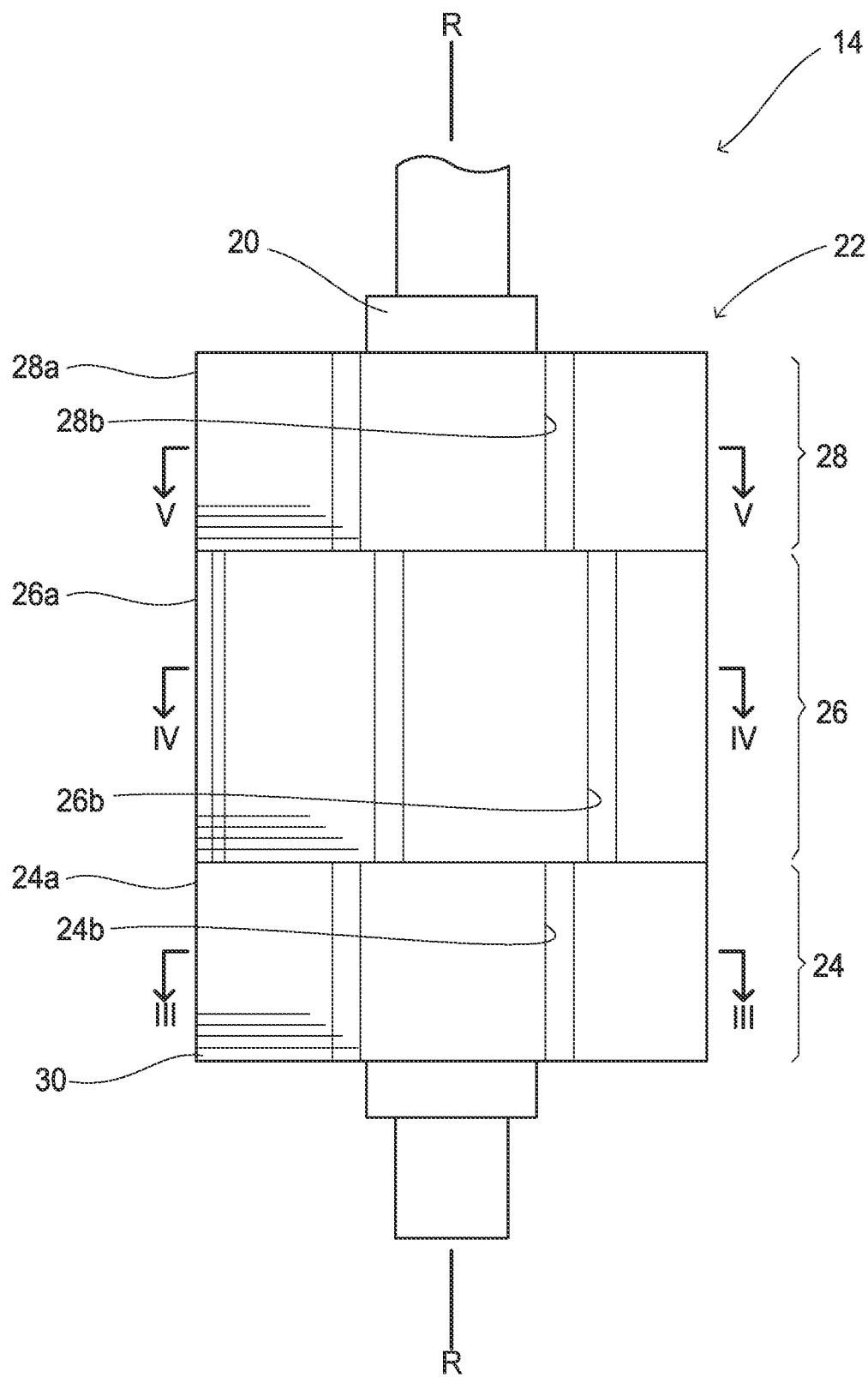
FIG. 2 schematically shows a rotor 14 of the motor 10.

In some aspects of the present teachings, the inner surface of the center hole and the outer surface of the shaft may each have a true circular cross-sectional shape. Such a configuration can effectively suppress the inner surface of the rotor core from unevenly deforming along the circumferential direction.

The "true circle" herein refers to a shape whose roundness is equal to or smaller than 100 micrometers. However, the above inner surface and the outer surface may be a true circle whose roundness is equal to or smaller than 50 micrometers, or further, may be a true circle whose roundness is equal to or smaller than 10 micrometers. A roundness of a shape is a difference between a radius of a circle circumscribing the outer edge of this shape and a radius of a circle inscribing the inner edge of this shape, and a smaller roundness means this shape is closer to a perfect circle.

In some aspects of the present teachings, the first core block and the second core block may have a same cross-sectional structure in a cross-section perpendicular to the rotation axis. The outer groove of the first core block and the outer groove of the second core block may be located at different positions in the circumferential direction.

In some aspects of the present teachings, the outer groove of the first core block and the outer groove of the second core block may each extend parallel to the rotation axis. Such a configuration allows the rotor core to have a step skew between the first core block and the second core block.

In some aspects of the present teachings, the outer groove of the first core block and the outer groove of the second core block may extend continuously with each other along a common helix. Such a configuration allows the rotor core to have a skew in which the orientations in the circumferential direction continuously change over the first core block and the second core block.

In some aspects of the present teachings, in addition to any of the above first to fifth aspects, the plurality of core blocks may further include a third core block. In this case, the third core block may be oriented in a same direction as the first core block in the circumferential direction. In other words, the plurality of core blocks may include two or more core blocks whose orientations in the circumferential direction are coincident with each other.

In some aspects of the present teachings, the first core block and the third core block may have a same cross-sectional structure in a cross-section perpendicular to the rotation axis. In this case, the outer groove of the first core block and the outer groove of the third core block may be positionally coincident with each other in the circumferential direction.

In some aspects of the present teachings, the outer groove of the first core block and the outer groove of the third core block may be located on a common straight line parallel to the rotation axis.

In some aspects of the present teachings, the second core block may be located between the first core block and the third core block.

In some aspects of the present teachings, the second core block may be in contact with each of the first core block and third core block. As another aspect, however, a spacing may be provided between the first core block and the second core block. Alternatively, another member such as a magnetic material and/or an insulating material may be interposed therebetween. The same applies between the second core block and the third core block.

The technique disclosed herein is also embodied as a method for manufacturing the above rotor. As the eleventh aspect of the present technique, the method may comprise: forming the first core block by stacking one or more first core plates on a jig having a center post, and forming the second core block by stacking one or more second core plates on the first core block formed on the jig. The forming of the first core block may comprise positioning the first core plates in the circumferential direction by engaging a first guide attached to the jig with an outer groove defined in an outer surface of each first core plate. The forming of the second core block may comprise positioning the second core plate in the circumferential direction by engaging a second guide attached to the jig with an outer groove defined in an outer surface of each second core plate.

In some aspects of the present teachings, the first guide may be configured to engage with the outer groove of each first core plate at a first position in the circumferential direction. The second guide may be configured to engage with the outer groove of each second core plate at a second position different from the first position in the circumferential direction.

In some aspects of the present teachings, the first guide and the second guide may be provided coaxially on a common guide member and configured to rotate independently from each other.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved rotors for electric motors, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

With reference to figures, an electric motor 10 of an embodiment will be described. The electric motor 10 of the present embodiment is employed in an electric vehicle as, but not particularly limited to, a traction motor. The electric vehicle herein at least includes a battery-driven vehicle, a hybrid electric vehicle, a plug-in hybrid electric vehicle, a fuel-cell electric vehicle, and the like.

As illustrated in FIG. 1, the electric motor 10 includes a casing 12, a rotor 14 and a stator 16. The casing 12 houses the rotor 14 and the stator 16. The casing 12 can in many cases be constituted of, but not particularly limited to, metal. In addition to the rotor 14 and the stator 16, the casing 12 may further house any power transmission mechanism(s) such as a reduction gear mechanism and/or a differential mechanism (not shown).

The rotor 14 is attached to the casing 12 via a pair of bearings 18. In this way, the rotor 14 is rotatably supported about a rotation axis R. In the present disclosure, the rotation axis of the rotor 14 of the electric motor 10 may simply be referred to as the rotation axis R of the electric motor 10. A configuration of the rotor 14 will be described later in detail.

The stator 16 is arranged around the rotor 14 within the casing 12. The stator 16 includes a stator core 16*a* and a stator coil 16*b* wrapped around the stator core 16*a*. The stator core 16a has a configuration in which a plurality of electromagnetic steel plates is stacked, and the stator coil 16b is configured to magnetize the stator core 16a. A specific configuration of the stator 16 is not particularly limited. Any configuration of a conventional stator can suitably be employed to the stator 16 of the present embodiment.

Next, with reference to FIG. 1 to FIG. 5, details of the rotor 14 will be described. The rotor 14 includes a shaft 20 and a rotor core 22. The shaft 20 is a member having a substantially column shape, and extends along the rotation axis R of the electric motor 10. The shaft 20 is rotatably supported by the aforementioned pair of bearings 18. The rotor core 22 is fixed to the shaft 20 and its rotation with respect to the shaft 20 is prohibited. Although not particularly limited, in the rotor 14 of the present embodiment, the rotor core 22 is shrink-fitted to the shaft 20.

The rotor core 22 includes a plurality of core blocs 24, 26, 28. The plurality of core blocks 24, 26, 28 is arranged along the rotation axis R. Each of the core blocks 24, 26, 28 has a configuration in which one core plate 30 or two or more core plates 30 are stacked along the rotation axis R. Each core plate 30 has a substantially plate shape, and is constituted of a material having great magnetic properties, such as an electromagnetic plate.

The plurality of core blocks 24, 26, 28 includes a first core block 24, a second core block 26, and a third core block 28. The second core block 26 is located between the first core block 24 and the third core block 28, and is in contact with both the first core block 24 and the third core block 28. However, the number of core blocks 24, 26, 28 which the rotor core 22 includes only needs to be two or more, and is not limited to three.

A skew (in particular, step skew) is provided at the rotor core 22. In particular, as is apparent from the comparison between FIG. 3 and FIG. 4, the first core block 24 and the second core block 26 are oriented differently from each other by an angle X in the circumferential direction C about the rotation axis R. Further, as is apparent from the comparison between FIG. 4 and FIG. 5, the second core block 26 and the third core block 28 are oriented differently from each other in the circumferential direction C by the angle X. On the other hand, the first core block 24 and the third core block 28 are in the same orientation as each other in the circumferential direction C. The first core block 24 and the second core block 26 are in contact with each other. However, a spacing may be provided between the first core block 24 and the second core block 26, or another member such as a magnetic material and/or an insulating material may be interposed therebetween. Similarly, the second core block 26 and the third core block 28 are in contact with each other. However, a spacing may be provided between the second core block 26 and the third core block 28, or another member such as a magnetic material and/or an insulating material may be interposed therebetween.

The plurality of core blocks 24, 26, 28 includes outer surfaces 24a, 26a, 28a and a plurality of outer grooves 24b, 26b, 28b defined in the outer surfaces 24a, 26a, 28a, respectively. The plurality of outer grooves 24b, 26b, 28b is arranged along the circumferential direction C such that they conform to positions of magnetic poles MP (see FIG. 3) in the core blocks 24, 28, 26, respectively, in order to reduce torque cripple of the electric motor 10. In the first core block 24, one of the plurality of outer grooves 24b extends parallel to the rotation axis R at a first position C1 in the circumferential direction C (see FIG. 3). Similarly, in the third core block 28, one of the plurality of outer grooves 28b extends parallel to the rotation axis R at the first position C1 in the circumferential direction C (see FIG. 5). On the other hand, in the second core block 26, one of the plurality of outer grooves 26b extends parallel to the rotation axis R at a second position C2 in the circumferential direction C (see FIG. 4). In other words, in the rotor core 22 of the present embodiment, a step skew is provided between the first core block 24 and the second core block 26 and also between the second core block 26 and the third core block 28. Although not particularly limited, the second position C2 is a position displaced counterclockwise from the first position C1 by the angle X.

Figure 3:
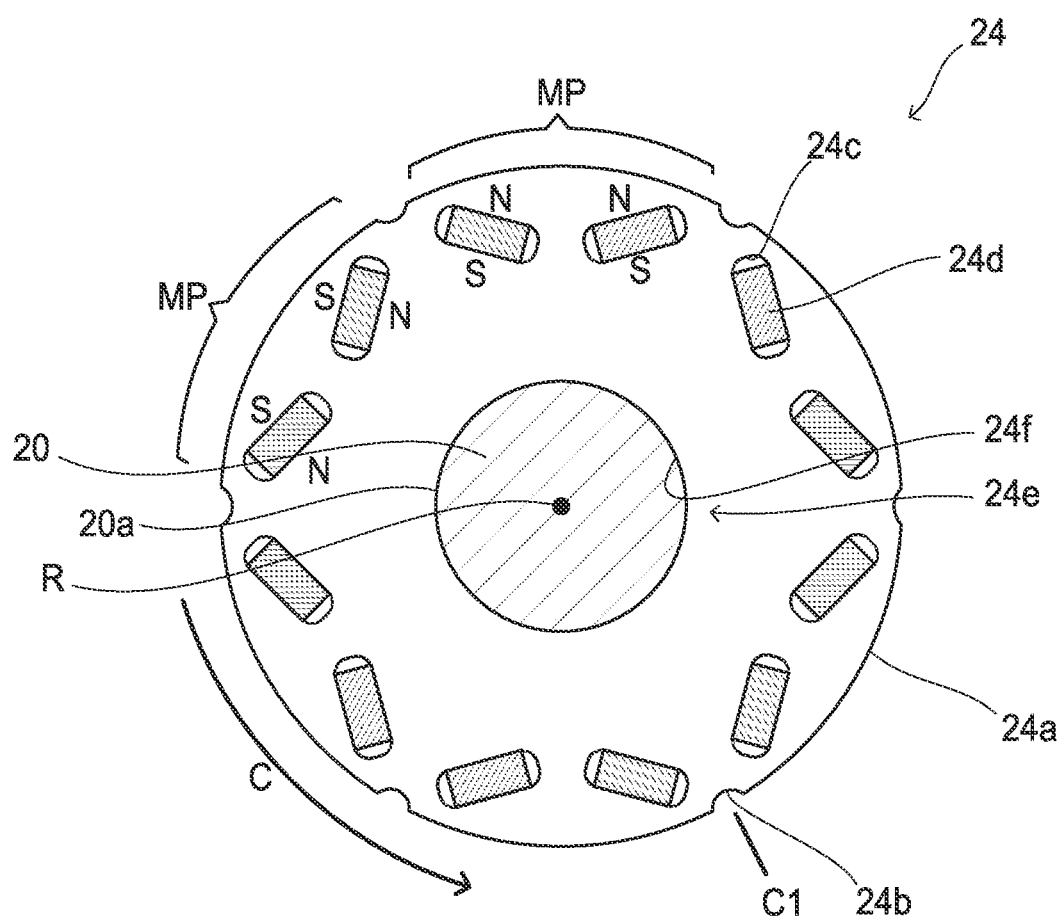
FIG. 3 shows a cross-sectional view taken along a III-III line in FIG. 2.
Figure 4:
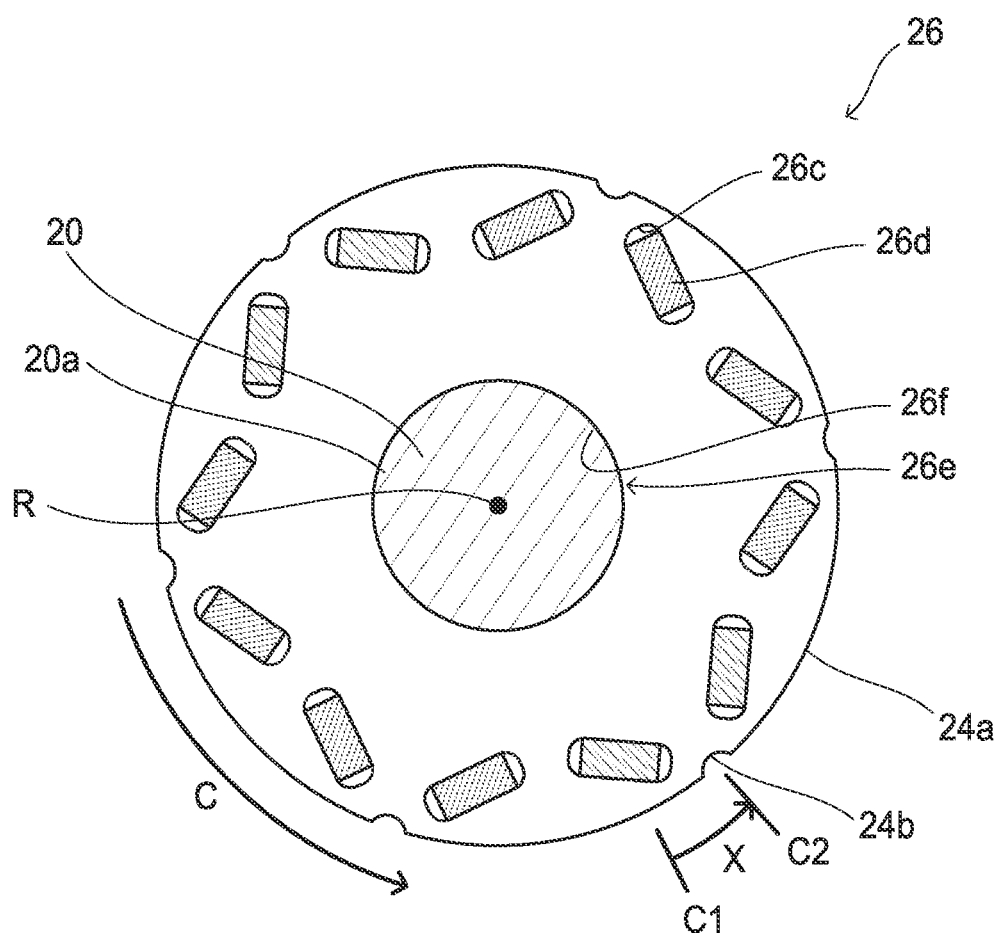
FIG. 4 shows a cross-sectional view taken along a IV-IV line in FIG. 2.
Figure 5:
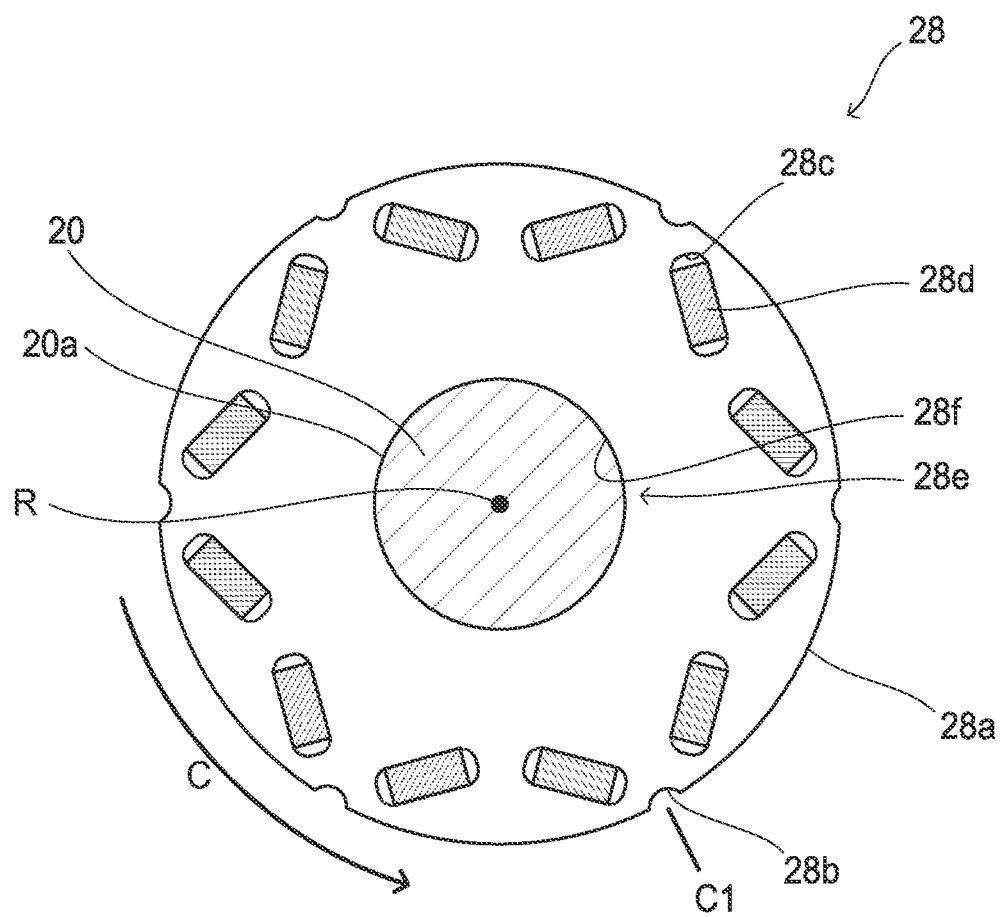
FIG. 5 shows a cross-sectional view taken along a V-V line in FIG. 2.

The plurality of core blocks 24, 26, 28 further includes a plurality of magnet holes 24c, 26c, 28c and a plurality of magnets 24d, 26d, 28d housed in the plurality of magnet holes 24c, 26c, 28c, respectively. As shown in FIG. 3, in the first core block 24, the plurality of magnet holes 24c forms a plurality of magnetic poles MP along the outer surface 24a. On of the outer grooves 24b is defined between two adjacent magnetic poles MP. The same applies to the second core block 26 and the third core block 28. Positions and arrangements of the magnet holes 24c, 26c, 28c and the magnets 24d, 26d, 28d are not particularly limited. As in an induction motor, for example, the plurality of core blocks 24, 26, 28 may not include the magnet holes 24c, 26c, 28c or the magnets 24d, 26d, 28d.

Although this is an example, in the present embodiment, every two magnets adjacent in the circumferential direction C among the plurality of magnets 24d, 26d, 28d form one magnetic pole MP. At the two adjacent magnetic poles MP, orientations of the magnets 24d, 26d, 28d with respect to the outer surfaces 24a, 26a, 28a are reversed from each other. In the present embodiment, twelve magnets 24d, 26d, 28d are arranged along the circumferential direction C, by which six magnetic poles MP are formed. As another embodiment, a single magnet 24d, 26d, 28d may be disposed at each magnetic pole MP, or three or more magnets 24d, 26d, 28d may be disposed at each magnetic pole MP.

The plurality of core blocks 24, 26, 28 further includes center holes 24e, 26e, 28e, respectively, through which the shaft 20 passes. Inner surfaces 24f, 26f, 28f of the center holes 24e, 26e, 28e have true circular cross-sectional shapes. In other words, a locally uneven shape, such as a key groove, is not disposed on the inner surfaces 24f, 26f, 28f of the center holes 24e, 26e, 28e. Similarly, the outer surface 20a of the shaft 20 has a true circular cross-sectional shape. In this way, the inner surfaces 24f, 26f, 28f of the plurality of core blocks 24, 26, 28 are in continuous contact in the circumferential direction C with the outer surface 20a of the shaft 20 over an entirety of the outer surface of the shaft 20. As describes above, "true circle" herein refers to a shape whose roundness is equal to or smaller than 100 micrometers.

In the rotor 14 of the present embodiment, the inner surfaces 24f, 26f, 28f of the plurality of core blocks 24, 26, 28 and the outer surface 20a of the shaft 20 each have a true circular cross-sectional shape. According to such a configuration, positioning in the circumferential direction C cannot be performed between each of the core blocks 24, 26, 28 and the shaft 20. However, the plurality of outer grooves 24b, 26b, 28b are defined in the plurality of core blocks 24, 26, 28, respectively. Since the plurality of outer grooves 24b, 26b, 28b are respectively defined in the outer surfaces 24a, 26a, 28a of the core blocks 24, 26, 28, it is possible to engage any guide member with one or more of the outer grooves 24b, 26b, 28b from outside regardless of the presence of the other core blocks 24, 26, 28. This enables setting the core blocks 24, 26, 28 in predetermined orientations with respect to the shaft 20 without providing an uneven form, such as a key or a key groove, on the outer surface 20a of the shaft 20 or the inner surfaces 24f, 26f, 28f of the core blocks 24, 26, 28. Since there is no uneven form such as a key or a key groove, neither the shaft 20 nor the core blocks 24, 26, 28 unevenly deforms in the circumferential direction C. This suppresses unnecessary vibration and noise upon rotation of the electric motor 10.

As described above, the outer grooves 24b, 26b, 28b of the core blocks 24, 26, 28 are provided in nature to suppress torque ripple of the electric motor 10. By using such existing outer grooves 24b, 26b, 28b for positioning the core blocks 24, 26, 28, design change of the core blocks 24, 26, 28 can be avoided. Consequently, the present technique can be practiced with no unintentional effect on properties of the rotor core 22. It should be noted that, as another embodiment, new outer groove(s) for positioning may be defined in the outer surfaces 24a, 26a, 28a of the core blocks 24, 26, 28 instead of, or as an alternative to, the aforementioned plurality of outer grooves 24b, 26b, 28b.

In the rotor 14 of the present embodiment, the first core block 24 and the second core block 26 have the same structure in a cross-section perpendicular to the rotation axis R. As another embodiment, however, the first core block 24 and the second core block 26 may have different structures from each other in a cross-section perpendicular to the rotation axis R. Similarly, in the rotor 14 of the present embodiment, the second core block 26 and the third core block 28 have the same structure in a cross-section perpendicular to the rotation axis R. As another embodiment, however, the second core block 26 and the third core block 28 may have different structures from each other in a cross-section perpendicular to the rotation axis R.

Next, with reference to FIGS. 6-11, a method for manufacturing the rotor 14 will be described. As described above, the rotor core 22 of the rotor 14 has a structure in which the plurality of core plates 30 is stacked along the shaft 20. Thus, the method for manufacturing the rotor 14 primarily includes a step of stacking the plurality of core plates 30 and a step of fixing the shaft 20 to the plurality of stacked core plates 30. Hereinafter, procedures to form the plurality of core blocks 24, 26, 28 in the step of stacking the plurality of core plates 30 will be described.

Figure 6:
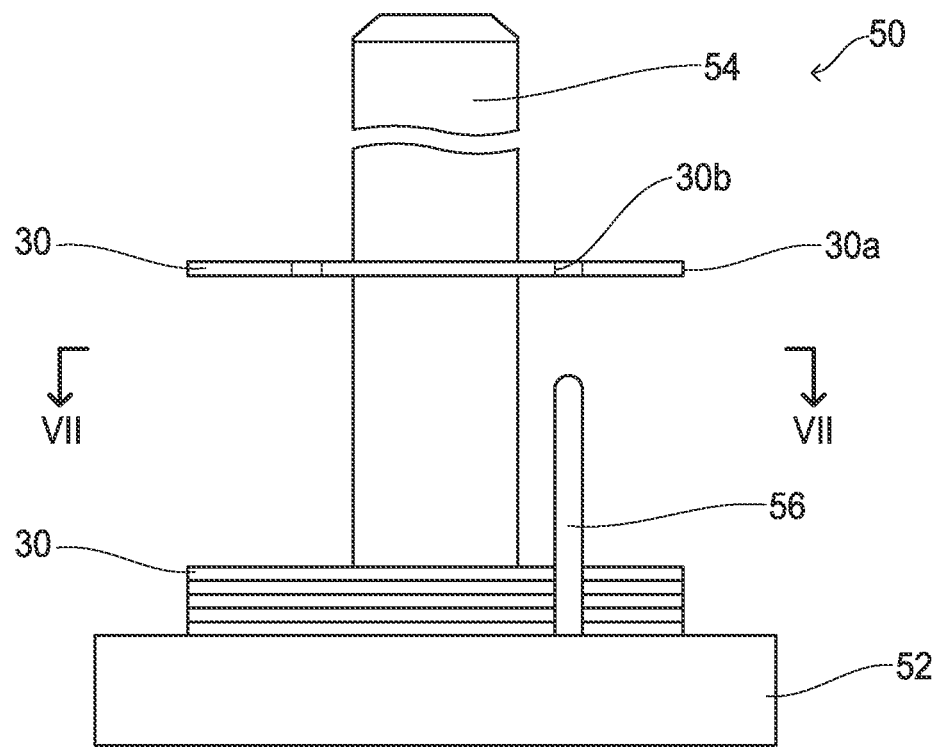
FIG. 6 shows a process to form a first core block 24 in a method for manufacturing the rotor 14.
Figure 7:
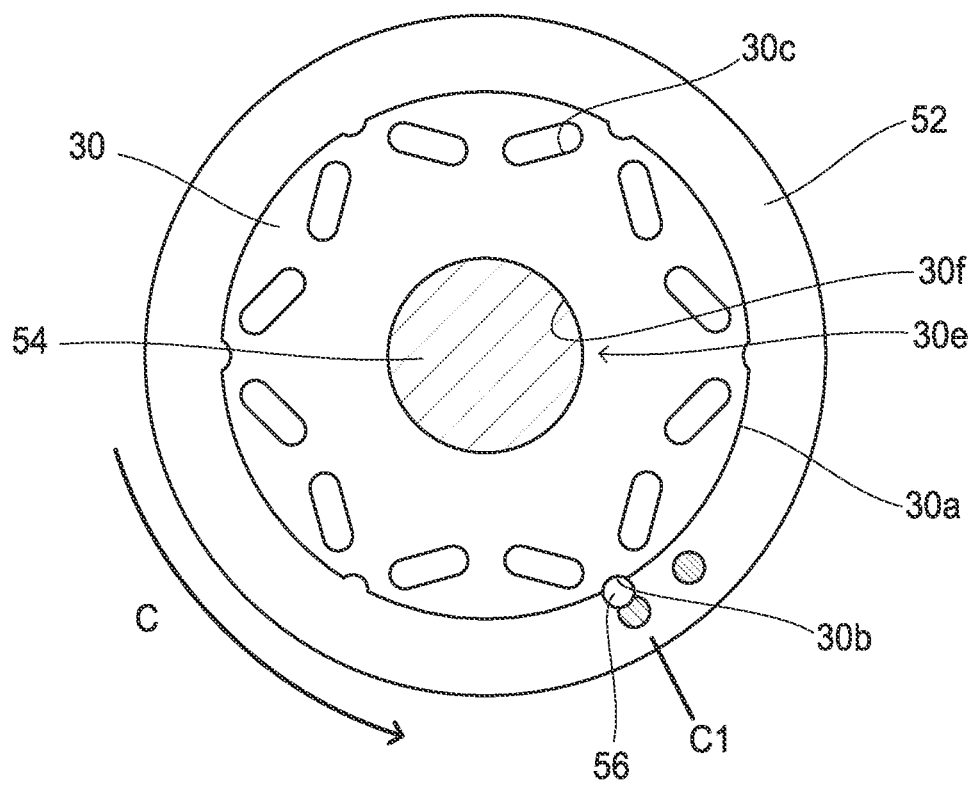
FIG. 7 shows a cross-sectional view taken along a VII-VII line in FIG. 6.

As shown in FIG. 6 and FIG. 7, at first, one or a plurality of core plates 30 is stacked by using a jig 50. Consequently, the first core block 24 is formed. Each core plate 30 has a shape corresponding to the cross-sectional structure of each of the aforementioned core blocks 24, 26, 28. In other words, each core plate 30 includes an outer surface 30a, a plurality of outer grooves 30b defined in the outer surface 30a, a plurality of magnet holes 30c, and a center hole 30e. An inner surface 30f of the center hole 30e has a true circular cross-sectional shape. The jig 50 includes a base 52 and a center post 54 extending from the base 52, and the center post 54 is inserted into the center hole 30e of each core plate 30 to coaxially position the stacked core plates 30.

When the first core block 24 is formed, a first guide 56 is attached to the base 52 of the jig 50. The first guide 56 is attached to the first position C1 in the circumferential direction C and fixed parallel to the center post 54. The first guide 56 engages with one of the outer grooves 30b of each core plate 30 stacked on the base 52. Consequently, the core plate(s) 30 is (are) positioned in the circumferential direction C. Here, a specific configuration of the first guide 56 is not limited. The first guide 56 only needs to be configured to engage with the outer groove(s) 30b of the core plate(s) 30 and position the core plate(s) 30 in the circumferential direction C.

Figure 8:
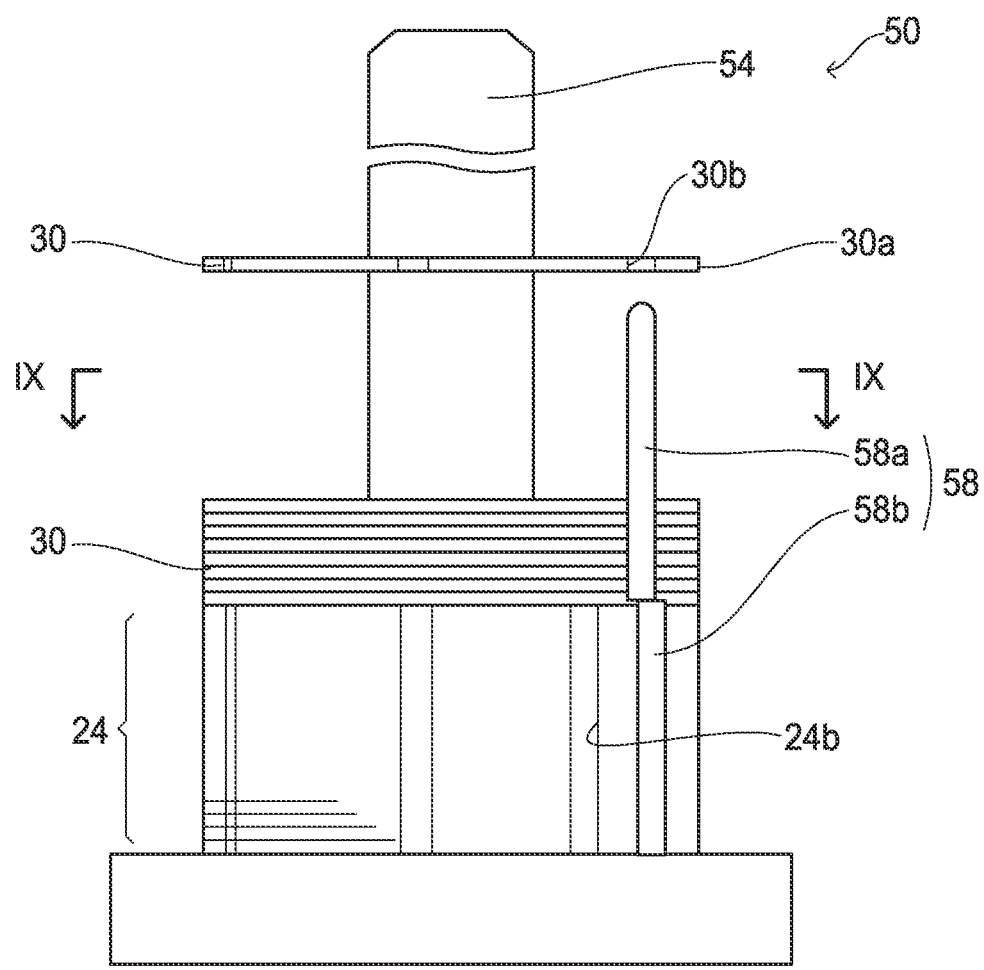
FIG. 8 shows a process to form a second core block 26 in the method for manufacturing the rotor 14.
Figure 9:
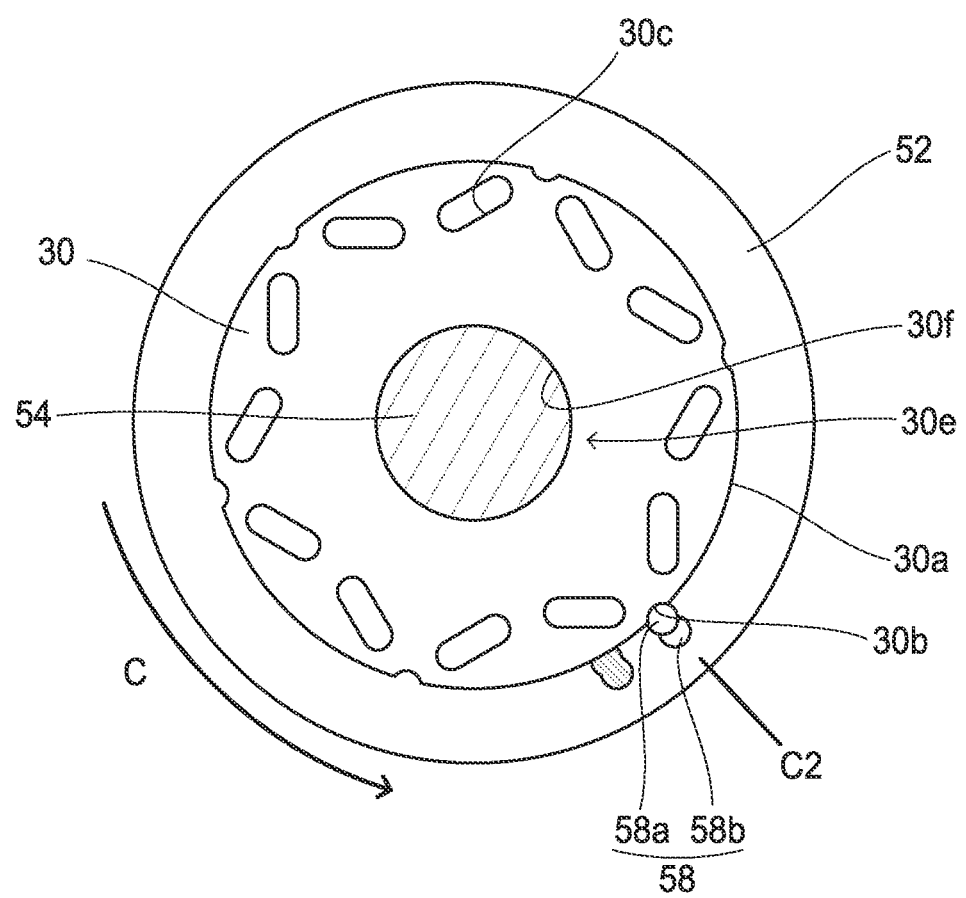
FIG. 9 shows a cross-sectional view taken along a IX-IX line in FIG. 8.

Next, as shown in FIG. 8 and FIG. 9, one or a plurality of core plates 30 is further stacked on the first core block 24 formed on the base 52. Consequently, the second core block 26 is formed. When the second core block 26 is formed, a second guide 58 is attached to the base 52 of the jig 50 instead of the first guide 56. The second guide 58 is attached to the second position C2 in the circumferential direction C and fixed parallel to the center post 54. The second guide 58 includes a guide part 58a and a non-guide part 58b. The guide part 58a engages with one of the outer grooves 30b of each core plate 30 stacked on the first core block 24. Consequently, the core plate(s) 30 constituting the second core block 26 is (are) oriented in the circumferential direction C differently from the core plate(s) 30 constituting the first core block 24. The non-guide part 58b extends from the base 52 to the guide part 58a on the side of the first core block 24. The non-guide part 58b is offset outward as compared to the guide part 58a. Consequently, the non-guide part 58b can be suppressed from coming into contact with the first core block 24.

Figure 10:
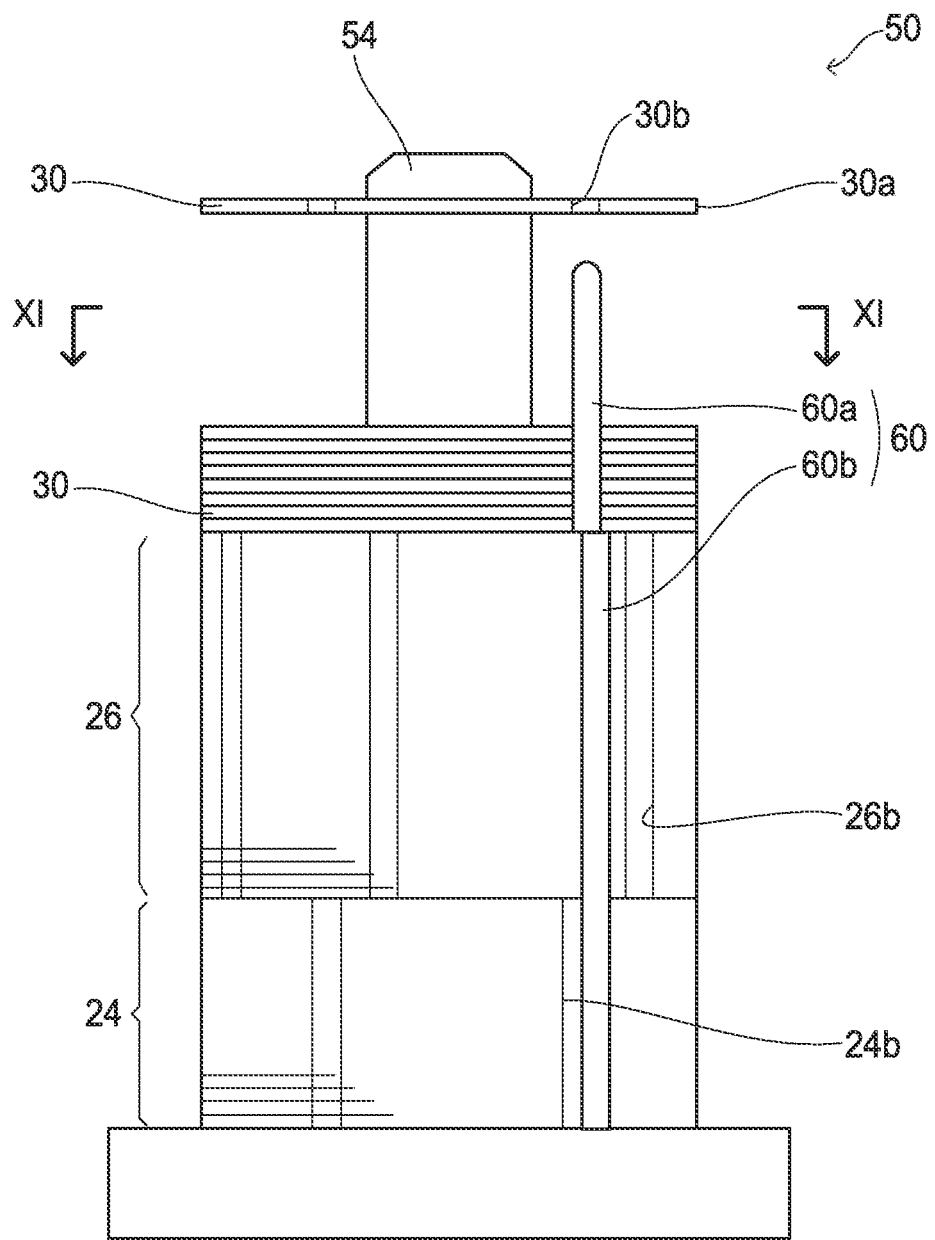
FIG. 10 shows a process to form a third core block 28 in the method for manufacturing the rotor 14.
Figure 11:
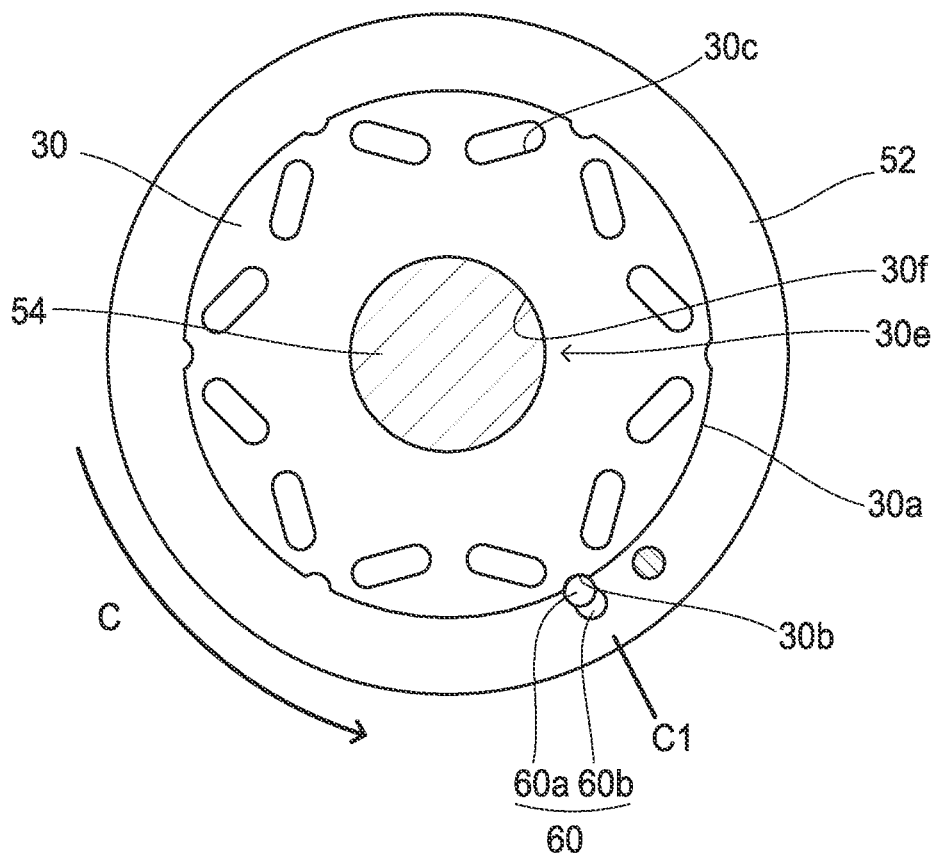
FIG. 11 shows a cross-sectional view taken along a XI-XI line in FIG. 10.

Next, as shown in FIG. 10 and FIG. 11, one or a plurality of core plates 30 is further stacked on the second core block 26 formed on the base 52. Consequently, the third core block 28 is formed. When the third core block 28 is formed, a third guide 60 is attached to the base 52 of the jig 50 instead of the second guide 58. The third guide 60 is attached to the first position C1 in the circumferential direction C and fixed parallel to the center post 54. The third guide 60 also includes a guide part 60a and a non-guide part 60b. The guide part 60a engages with one of the outer grooves 30b of each core plate 30 stacked on the second core block 26. Consequently, the core plate(s) 30 constituting the third core block 28 is (are) oriented in the same orientation in the circumferential direction C as the core plates 30 of the first core block 24. The non-guide part 60b extends from the base 52 to the guide part 60a on the side of the first core block 24 and the second core block 26. In the third guide 60 as well, the non-guide part 60b is offset outward as compared to the guide part 60a. Consequently, the non-guide part 60b can be suppressed from coming into contact with the first core block 24 or the second core block 26.

Figure 12:
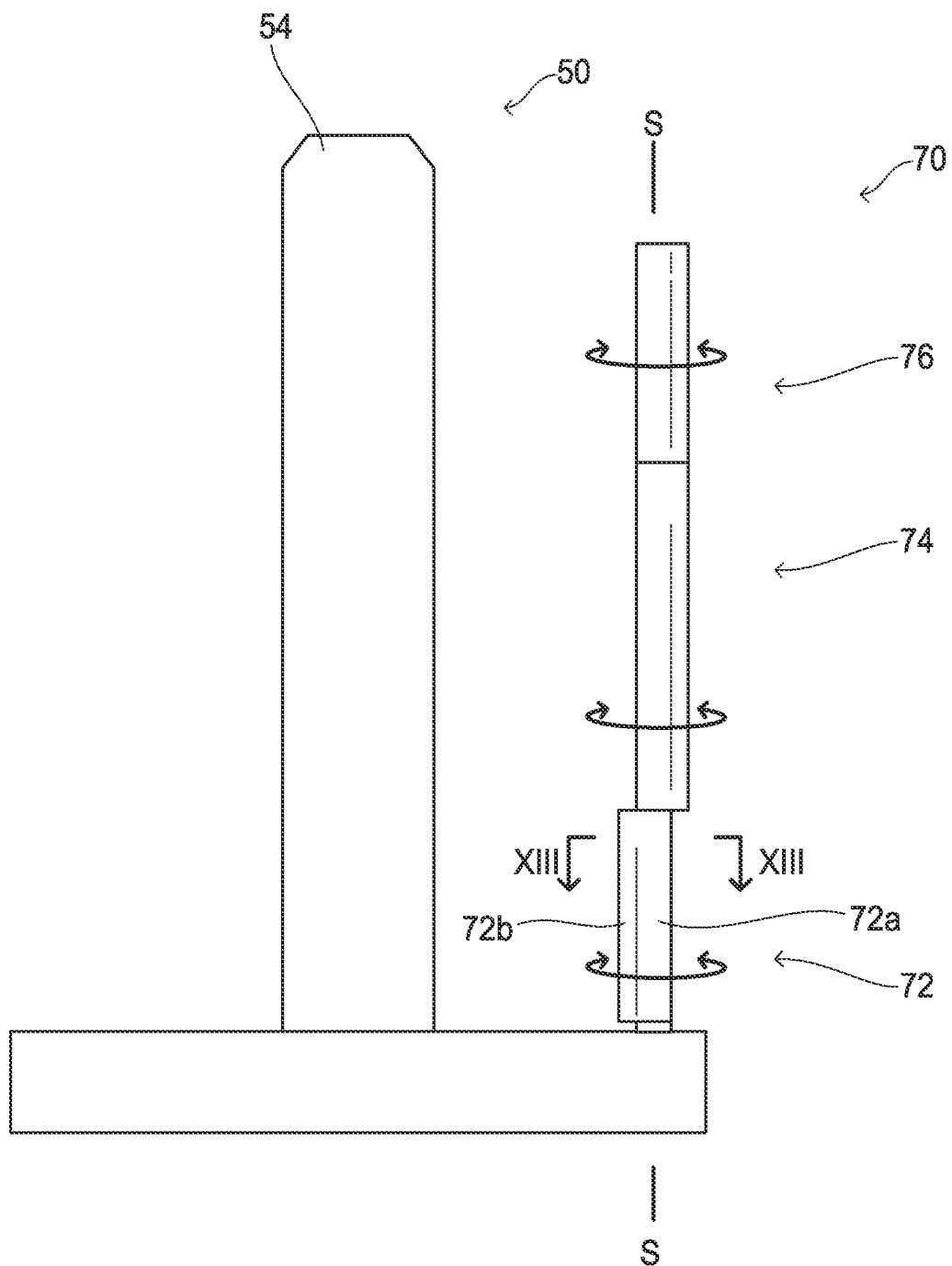
FIG. 12 schematically shows a common guide member 70.
Figure 13:
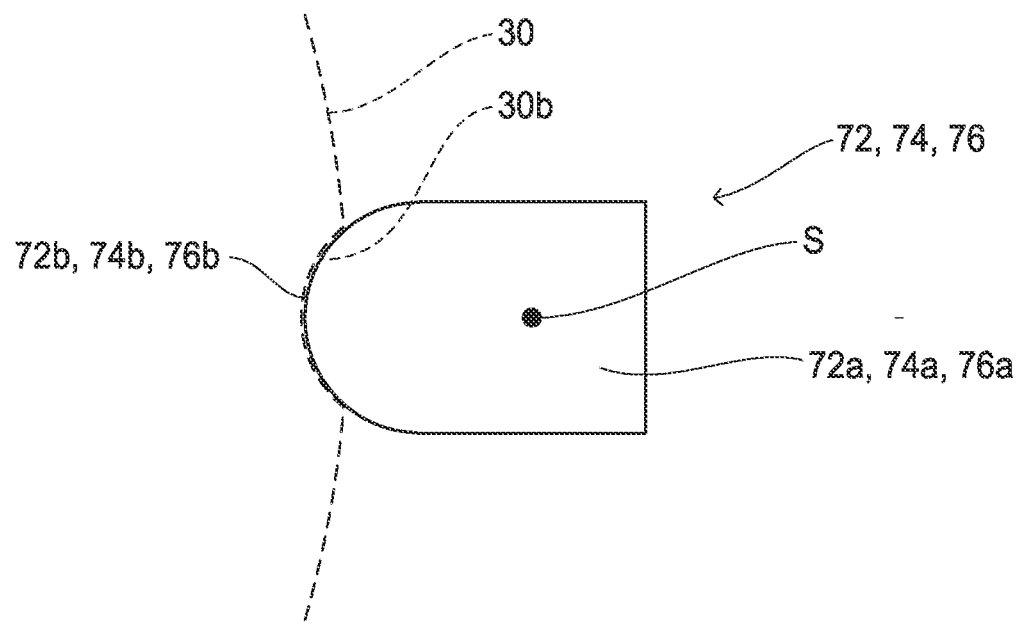
FIG. 13 shows a cross-sectional view taken along a XIII-XIII line in FIG. 12.
Figure 14:
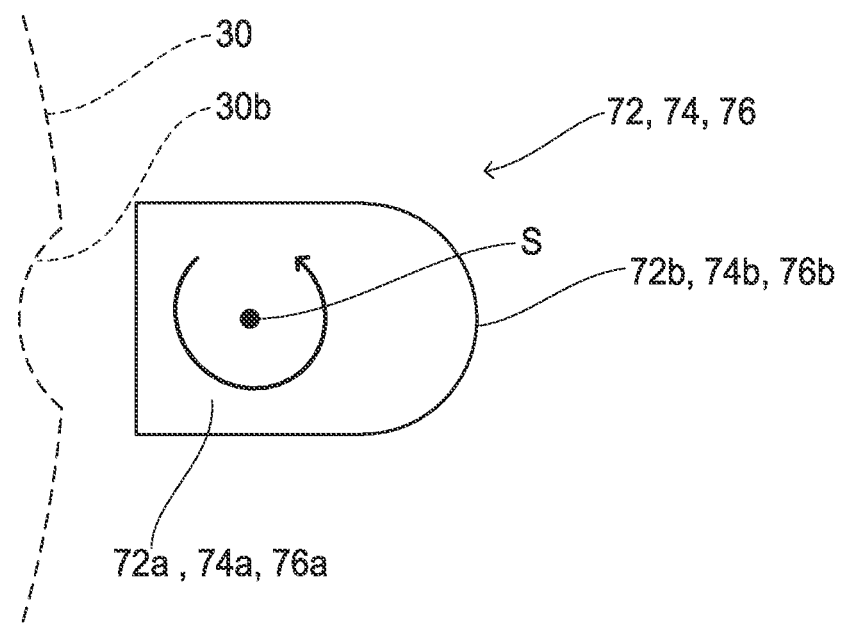
FIG. 14 shows guide parts 72, 74, 76 moving away from a core plate 30 by rotating in the same cross-section as FIG. 13.

As described above, by using the outer grooves 30b defined in the core plates 30 and the plurality of guides 56, 58, 60 configured to engage with the outer grooves 30b, the rotor core 22 including a step skew can be formed. The numbers of the guides 56, 58, 60 are not particularly limited. For example, as shown in FIG. 12 to FIGS. 14, a single guide member 70 may be used instead of the plurality of guides 56, 58, 60. The guide member 70 includes a first guide part 72 corresponding to the first guide 56, a second guide part 74 corresponding to the second guide 58, and a third guide part 76 corresponding to the third guide 60. The first guide part 72, the second guide part 74 and the third guide part 76 are arranged coaxially and configured to rotate independently from each other. The guide parts 72, 74, 76 include shaft portions 72a, 74a 76a and guide surfaces 72b, 74b, 76b laterally protruding from the shaft portions 72a, 74a, 76a, respectively. With such a configuration, by rotating independently from each other, the guide parts 72, 74, 76 can engage with the outer grooves 30b of the core plates 30 and move away from the core plates 30 to avoid contact with the core plates 30.

Figure 15:
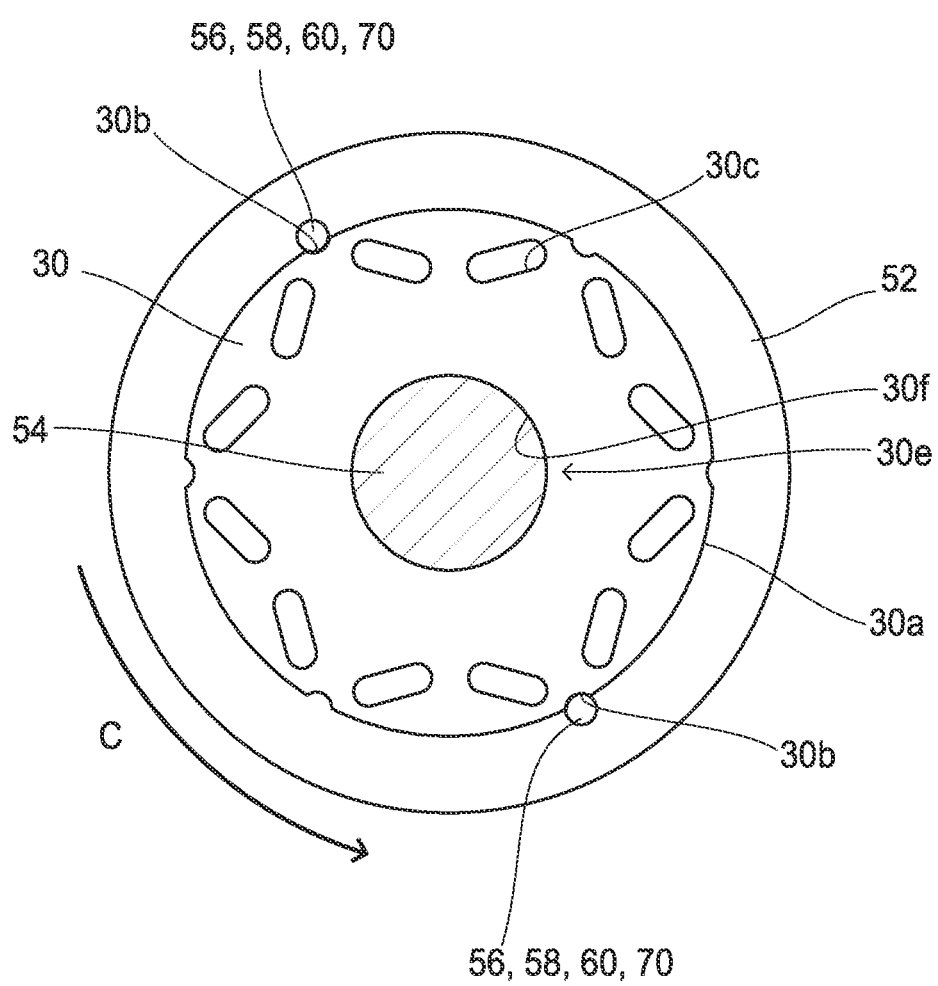
FIG. 15 explains a manufacturing method of another embodiment.

In the aforementioned manufacturing method, when the core plates 30 are stacked, one of the plurality of grooves 30b of each core plate 30 is used to position the core plates 30 in the circumferential direction C. Contrary to this, as shown in FIG. 15, in another embodiment, two or more of the plurality of outer grooves 30b of each core plate 30 may be used to position the core plates 30 in the circumferential direction C. With such a configuration, positioning of the core plates 30 can be performed more accurately. In particular, when two outer grooves 30b opposite to each other are used, misalignment of the core plates 30 can be prevented, which makes the center post 54 of the jig 50 unnecessary, for example.

Figure 16:
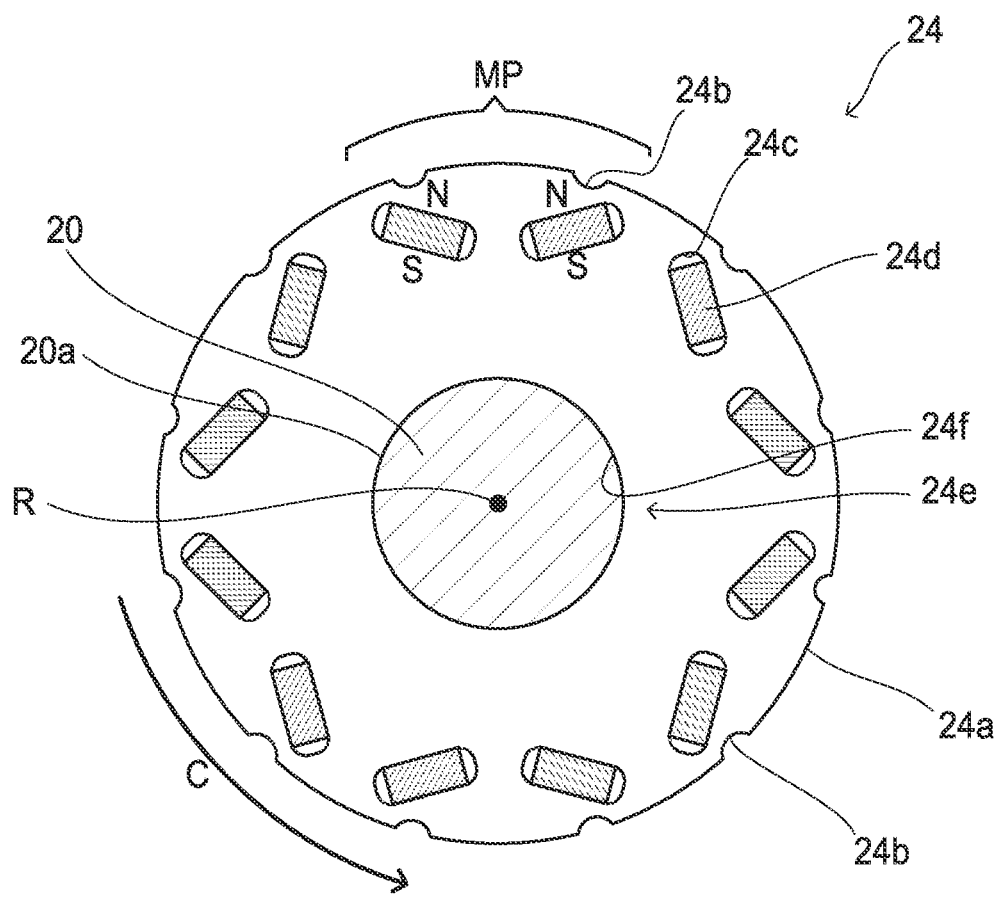
FIG. 16 is a figure illustrating another arrangement of a plurality of outer grooves 24b, taking the first core block 24 as an example.

In the rotor core 22 of the present embodiment, a plurality of magnetic poles MP is formed and each of the plurality of outer grooves 24b, 26b, 28b is provided between two adjacent magnetic poles MP. Contrary to this, as shown in FIG. 16, each of the plurality of outer grooves 24b of the first core block 24 may be positioned such that it faces corresponding one of magnets 24d in a magnetic pole. The same applies to the second core block 26 and the third core block 28. With such a configuration as well, the plurality of outer grooves 24b, 26b, 28b can be arranged equidistant along the circumferential direction C.

Figure 17:
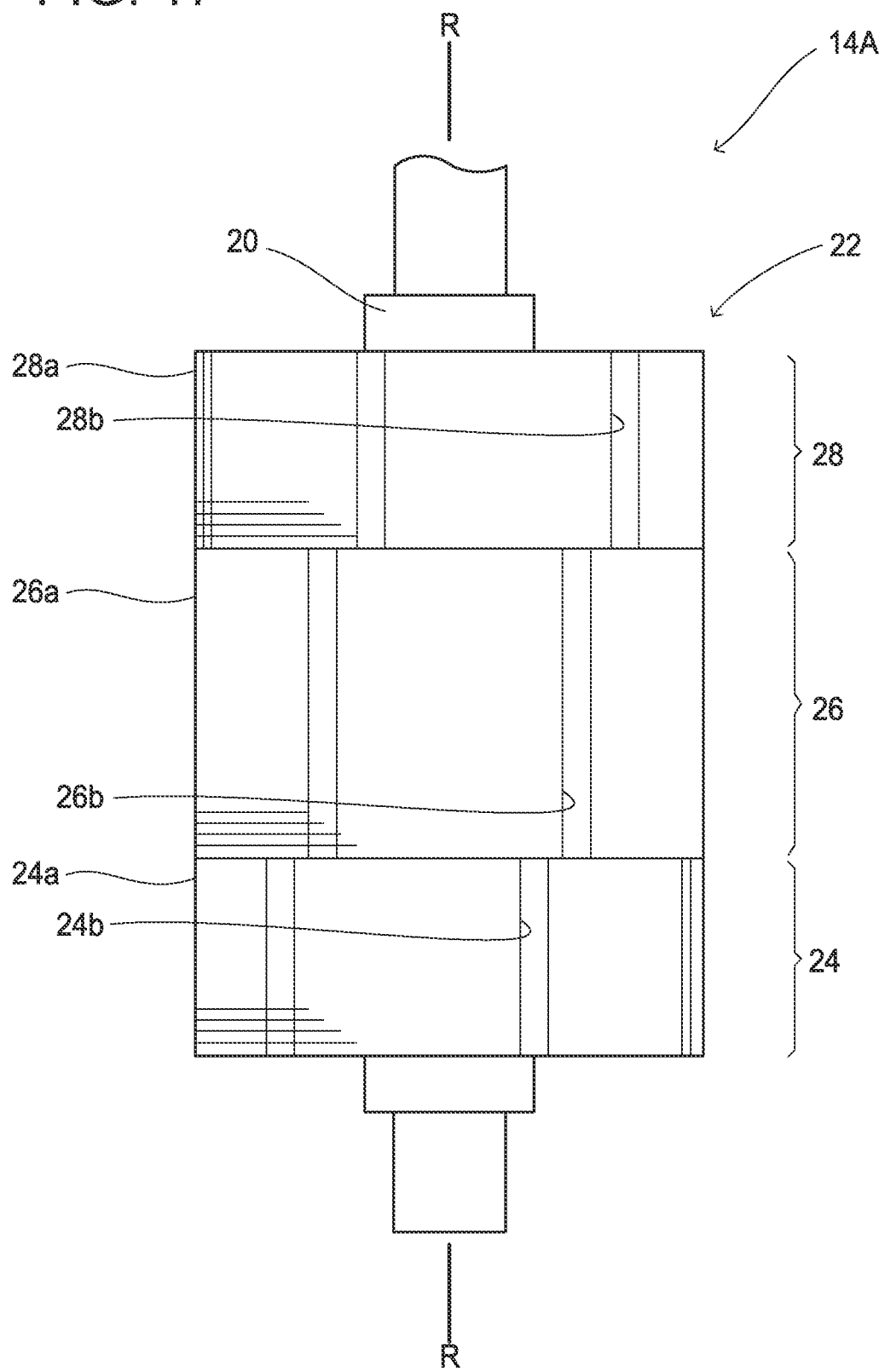
FIG. 17 schematically shows a rotor 14A of another embodiment.
Figure 18:
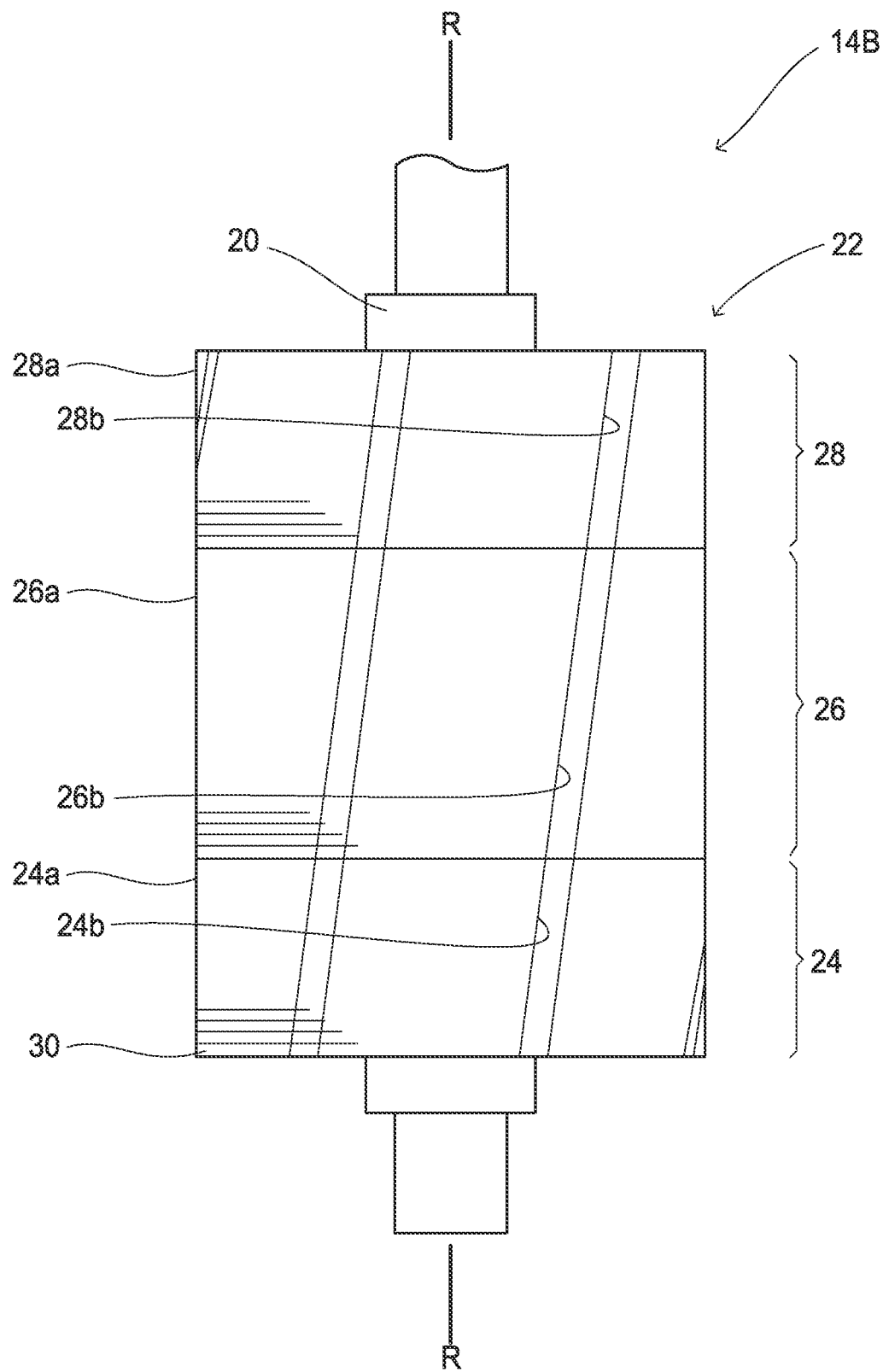
FIG. 18 schematically shows a rotor 14B of yet another embodiment.

In the aforementioned rotor core 22, the orientations of the first core block 24 and the third core block 28 in the circumferential directions C are coincident with each other. In other words, the outer grooves 24b of the first core block 24 and the outer grooves 28b of the third core block 28 are on common straight lines parallel to the rotation axis R. Contrary to this, as shown in FIG. 17, in a rotor 14A of another embodiment, the orientations of the first core block 24 and the third core block 28 in the circumferential direction may be different from one another. Alternatively, as shown in FIG. 18, in a rotor 14B of yet another embodiment, a skew may be provided so that the orientations of the core plates 30 continuously vary. In other words, the outer grooves 24b, 26b, 28b of the plurality of core blocks 24, 26, 28 may extend continuously with each other along a common helix.

What is claimed is:

1. A rotor for an electric motor, comprising:
   a shaft extending along a rotation axis of the electric motor; and
   a rotor core comprising a plurality of core blocks fixed to the shaft and arranged along the rotation axis,
   wherein
   the plurality of core blocks includes a first core block and a second core block that are oriented differently from each other in a circumferential direction about the rotation axis,
   each of the plurality of core blocks comprises an outer surface extending along the circumferential direction, a center hole through which the shaft passes, and an outer groove defined in the outer surface, and
   an inner surface of the center hole is in continuous contact in the circumferential direction with an outer surface of the shaft over an entire circumference thereof.

2. The rotor according to claim 1, wherein the inner surface of the center hole and the outer surface of the shaft each have a true circular cross-sectional shape.

3. The rotor according to claim 1, wherein
   the first core block and the second core block have a same cross-sectional structure in a cross-section perpendicular to the rotation axis, and
   the outer groove of the first core block and the outer groove of the second core block are located at different positions in the circumferential direction.

4. The rotor according to claim 3, wherein the outer groove of the first core block and the outer groove of the second core block each extend parallel to the rotation axis.

5. The rotor according to claim 3, wherein the outer groove of the first core block and the outer groove of the second core block extend continuously with each other along a common helix.

6. The rotor according to claim 1, wherein
   the plurality of core blocks further includes a third core block, and
   the third core block is oriented in a same orientation as the first core block in the circumferential direction.

7. The rotor according to claim 6, wherein
   the first core block and the third core block have a same cross-sectional structure in a cross-section perpendicular to the rotation axis, and
   the outer groove of the first core block and the outer groove of the third core block are positionally coincident with each other in the circumferential direction.

8. The rotor according to claim 7, wherein the outer groove of the first core block and the outer groove of the third core block are located on a common straight line parallel to the rotation axis.

9. The rotor according to claim 8, wherein the second core block is located between the first core block and the third core block.

10. The rotor according to claim 9, wherein the second core block is in contact with each of the first core block and third core block.

11. A method for manufacturing the rotor according to claim 1, comprising:
    forming the first core block by stacking one or more first core plates on a jig having a center post, and
    forming the second core block by stacking one or more second core plates on the first core block formed on the jig,
    wherein
    the forming of the first core block comprises positioning the first core plates in the circumferential direction by engaging a first guide attached to the jig with an outer groove defined in an outer surface of each first core plate, and
    the forming of the second core block comprises positioning the second core plates in the circumferential direction by engaging a second guide attached to the jig with an outer groove defined in an outer surface of each second core plate.

12. The method according to claim 11, wherein
    the first guide is configured to engage with the outer groove of each first core plate at a first position in the circumferential direction, and
    the second guide is configured to engage with the outer groove of each second core plate at a second position different from the first position in the circumferential direction.

13. The method according to claim 11, wherein the first guide and the second guide are provided coaxially on a common guide member and configured to rotate independently from each other.

* * * * *